United States Patent
Malsam et al.

(10) Patent No.: US 9,342,076 B2
(45) Date of Patent: May 17, 2016

(54) ADJUSTABLE SPEED IRRIGATION SYSTEM AND METHOD OF USE

(75) Inventors: Craig Malsam, Omaha, NE (US); Mark Moeller, Valley, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 532 days.

(21) Appl. No.: 12/868,315

(22) Filed: Aug. 25, 2010

(65) Prior Publication Data

US 2012/0053776 A1  Mar. 1, 2012

(51) Int. Cl.
| | |
|---|---|
| G06F 7/70 | (2006.01) |
| G06F 19/00 | (2011.01) |
| G06G 7/00 | (2006.01) |
| G05D 1/02 | (2006.01) |
| A01G 25/09 | (2006.01) |

(52) U.S. Cl.
CPC ............ *G05D 1/0278* (2013.01); *A01G 25/092* (2013.01); *G05D 1/0268* (2013.01); *G05D 2201/0201* (2013.01)

(58) Field of Classification Search
CPC .......... G05D 2201/00; G05D 2201/02; G05D 2201/0201; G05D 1/0278
USPC ................................................. 701/27, 50, 93
See application file for complete search history.

(56) References Cited

U.S. PATENT DOCUMENTS

| | | | |
|---|---|---|---|
| 4,226,366 A | 10/1980 | Nortoft | |
| 5,913,915 A | 6/1999 | McQuinn | |
| 5,950,921 A * | 9/1999 | Cain et al. | ........................ 239/1 |
| 5,978,723 A | 11/1999 | Hale | |
| 5,995,895 A | 11/1999 | Watt | |
| 6,062,165 A | 5/2000 | Sieling | |
| 6,507,782 B1 * | 1/2003 | Rumbo | ................ G05D 1/0202 244/182 |
| 6,517,281 B1 * | 2/2003 | Rissi | ..................... E01C 19/203 239/659 |
| 6,711,501 B2 | 3/2004 | McClure | |
| 7,584,023 B1 | 9/2009 | Palmer | |
| 7,584,053 B2 | 9/2009 | Abts | |
| 2002/0008167 A1 | 1/2002 | Haberland | |

(Continued)

FOREIGN PATENT DOCUMENTS

WO          9728692          8/1997

OTHER PUBLICATIONS

Han Wenting, Fen Hao, Wu Pute, Yang Qing; Variable-Rate Contour-Controlled Sprinklers for Precision Irrigation; 2007 ASABE Annual International Meeting; Jun. 17-20, 2007; pp. 1-6; Paper No. 072249; American Society of Agricultural and Biological Engineers.

(Continued)

*Primary Examiner* — Imran Mustafa
(74) *Attorney, Agent, or Firm* — Milligan PC LLO

(57) ABSTRACT

The present disclosure is generally directed to an adjustable speed irrigation system having a control panel, at least one water conduit, at least one tower, and a position sensor. A user inputs a user-defined end destination at the user-defined arrival time into the control panel. The control panel receives a current position of the irrigation system from the position sensor. The control panel compares the current position to the user-defined end destination and calculates a new optimum ground speed required to reach the user-defined end destination at the user-defined time based on the current position of the irrigation system. The control panel then sends a signal to a speed control unit to adjust the speed of the irrigation system to match the new optimum ground speed.

5 Claims, 2 Drawing Sheets

(56) References Cited

U.S. PATENT DOCUMENTS

| | | | | |
|---|---|---|---|---|
| 2004/0117070 | A1* | 6/2004 | Barker | A01G 25/16 700/284 |
| 2007/0267524 | A1* | 11/2007 | Mack | 239/729 |
| 2008/0269956 | A1* | 10/2008 | Dix | A01B 69/008 701/1 |
| 2009/0216410 | A1* | 8/2009 | Allen et al. | 701/50 |
| 2010/0032493 | A1* | 2/2010 | Abts | A01G 25/092 239/11 |

OTHER PUBLICATIONS

E. W. Rochester, H.R. Duke, D.F. Heermann; Computer-Controlled Sensor Carriage for Simulated Center Pivot Movement; Transaction of the American Society of Agricultural Engineers; May-Jun. 1993; pp. 795-797; vol. 36, No. 3; American Society of Agricultural and Biological Engineers.

Athneal D. Marzolf, Earl C. Stegman, Steve W. Wagner; On-Site Microcomputer-Based Irrigation Scheduling: I Hardware Design; American Society of Agricultural Engineers; Jun. 23-26, 1985; pp. 1-16; American Society of Agricultural Engineers.

* cited by examiner

ADJUSTABLE SPEED IRRIGATION SYSTEM AND METHOD OF USE

BACKGROUND OF THE DISCLOSURE

Center pivot and linear move irrigation systems have become an essential component in present day commercial agriculture since their introduction over sixty years ago. The first irrigation systems suffered from many mechanical and design shortcomings which have resulted in many improvements throughout their existence. One notable improvement in the art was the introduction and development of electronic control and drive systems used to control the operation of the irrigation system and self-propel the irrigation system through the field. Notwithstanding the benefits attributed to this improvement, one particular shortcoming of the electronic control and drive systems known in the art is that the actual ground speed of the irrigation system is often less than a predetermined speed that is set at the commencement of operation due to field conditions.

Irrigation systems known in the art set a predetermined speed for each tower at the commencement of operation. The predetermined speed is set such that the irrigation system applies a fixed amount of an applicant, at a given flow rate, over a defined area of an agricultural field, in a defined amount of time. The speeds of these current irrigation systems are set and maintained throughout operation strictly based on relative position of the towers; however, the tires of the towers often become bogged down or slip in mud that is present in the depression of the tire's track. Water collects in the depression created as the tires traverse the fields and the depressed track's muddy condition and associated tire slippage often cause the actual ground speed of the irrigation system to be less than the predetermined irrigation speed set at the commencement of the application. When the actual ground speed is less than the speed required to apply an applicant at a given rate, over a desired area, in a given amount of time, the result is that a portion of the field receives too much applicant. When the amount of applicant is fixed, like when applying fertilizer, herbicide, or pesticide, too much applicant is applied to a portion of the field and no applicant is applied to the portion of the field remaining when the fixed amount of the applicant is exhausted.

There are many adverse consequences that can be avoided by overcoming this shortcoming in the prior art, including, but not limited to: field damage, reduction of maximum crop yield due to over or under application of the applicant, and multiple economic inefficiencies due to the costs associated with obtaining, purchasing, and delivering additional applicant to complete the application of an applicant on the field. Therefore, a need exists in the art for an irrigation system that monitors the actual ground speed of the irrigation system and adjusts the speed of the irrigation system's drive system to maintain an actual ground speed about equal to the predetermined application speed such that the irrigation system reaches a predetermined user-defined end destination in a predetermined amount of time.

BRIEF SUMMARY OF THE DISCLOSURE

The present disclosure is generally directed to an adjustable speed irrigation system having a control panel, at least one water conduit, at least one drive unit, and a position sensor for determining a current position of the irrigation system. The irrigation system may be any type of irrigation system known in the art, with the two prevalent irrigation systems being center pivot and linear move. The at least one drive unit generally supports the water conduit(s), and the at least one drive unit is supported by at least one tire. The tires are generally driven by a drive means that includes a drive motor connected to the at least one drive unit and a gearbox that causes the tires to rotate. The control panel monitors many functions and conditions of the adjustable speed irrigation system while in operation, as well as processing and controlling many of the operational parameters of the adjustable speed irrigation system of the present disclosure.

In an embodiment, a user enters one or more user-defined inputs into the control panel, including but not limited to: a user-defined end destination of the irrigation system, a user-defined arrival time, and a user-desired application rate of the applicant. Applicants applied by irrigation systems include, but are not limited to: water, fertilizer, herbicide, or pesticide. Based on the user input, the control panel predetermines the optimum ground speed of the irrigation system such that the irrigation system reaches the user-defined end destination at the user-defined arrival time. In addition, the control panel predetermines the application depth so that the desired amount of applicant over a known area is applied during the user-defined arrival time. During operation, the current position of the irrigation system is determined by the control panel by conventional means at predetermined time intervals, typically by the position sensor. The position sensor may include an angle sensor mounted at the center pivot structure or by a global positioning system (GPS) receiver mounted at or proximate to the end of the irrigation system. The control panel compares the current position to the user-defined end destination and calculates a new optimum ground speed required to reach the user-defined end destination at the user-defined time based on the current position of the irrigation system. The control panel transmits a signal to a speed control unit to adjust the current speed of the irrigation system to match the new optimum ground speed.

The control panel continues to perform this calculation at pre-defined intervals until the irrigation system has reached the predetermined user-defined end destination at the user-defined time.

Other aspects and advantages of the present disclosure will be apparent from the following detailed description of the preferred embodiments and the accompanying drawing figures.

BRIEF DESCRIPTION OF THE SEVERAL VIEWS OF THE DRAWING

The accompanying drawing forms a part of the specification and is to be read in conjunction therewith, in which like reference numerals are employed to indicate like or similar parts in the various views, and wherein.

DETAILED DESCRIPTION OF THE DISCLOSURE

The following detailed description of the disclosure references the accompanying drawing figures that illustrate specific embodiments in which the disclosure can be practiced. The embodiments are intended to describe aspects of the disclosure in sufficient detail to enable those skilled in the art to practice the disclosure. Other embodiments can be utilized and changes can be made without departing from the scope of the present disclosure. The present disclosure is defined by the appended claims and the description is, therefore, not to be taken in a limiting sense and shall not limit the scope of equivalents to which such claims are entitled.

Figure 1:
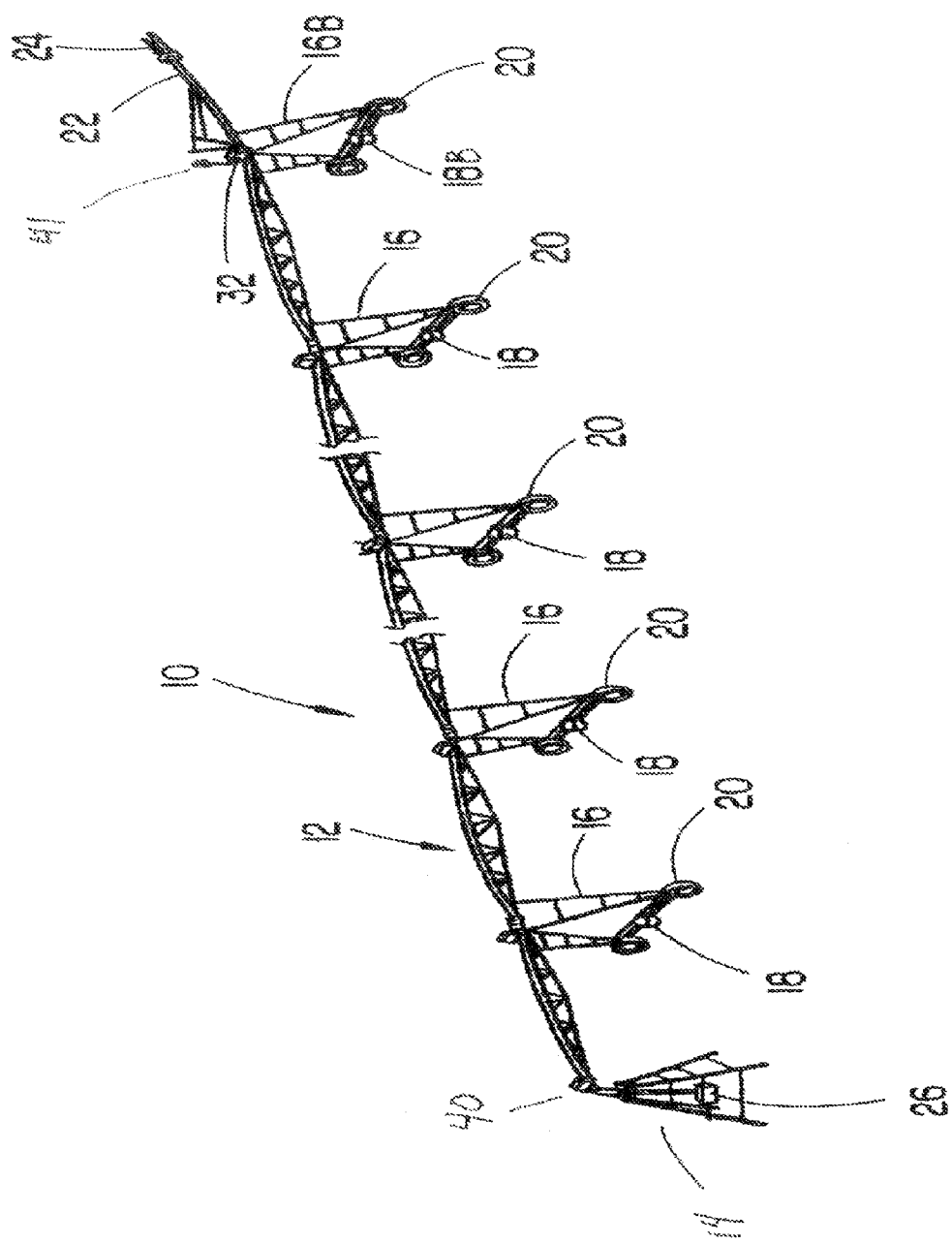
FIG. 1 is a side view of an adjustable speed irrigation system in accordance with one embodiment of the present disclosure.

Turning now to the drawing figures, and particularly FIG. 1, the present disclosure is directed to an adjustable speed irrigation system 10 having at least one water conduit 12, at least one drive unit 16, a control panel 26, and a position sensor (40 or 41). Irrigation system 10 may be any type of irrigation system 10 known in the art, with two prevalent irrigation system 10 types being center pivot and linear move. FIG. 1 illustrates an implementation of the present disclosure where the irrigation system 10 is a center pivot. Center pivot irrigation systems 10 known in the art generally have a center pivot structure 14 and at least one water conduit 12 that extends outwardly from the center pivot structure 14 and rotates in a radial direction around the conventional pivot structure 14. Center pivot irrigation systems 10 introduce water into irrigation system 10 through piping located at center pivot structure 14 and often draw the water from a well located underneath center pivot structure 14 or in close proximity to the field. Center pivot structure 14 can be fixed, as shown in FIG. 1, or can be towable such that a farmer can move irrigation system 10 from one field to another.

Linear move irrigation systems are often used in longer, more rectangular fields. Linear move irrigation systems, known in the art, generally span a desired length across the short dimension of the field and travel linearly along the long direction. Water is generally supplied to linear move irrigation systems through a hose pulled by irrigation system, or through an irrigation ditch containing water that runs along the outside of the field's longer dimension. In addition to the center pivot and linear move irrigation systems described above, other embodiments of irrigation systems are well known in the art and within the scope of the present disclosure.

The water conduit 12 may include a pipe 12 or boom 12. Water conduit 12 is comprised of a plurality of pipe sections joined together in an end-to-end relationship that are supported by a plurality of drive units 16. A common range of span length of each pipe section is about 50 feet to about 225 feet. The water pipe section of water conduit 12 may be constructed from any structural shape known in the art. Water conduit 12 is generally a thin-walled pipe having any diameter wherein the more common diameters in the art include: five inches (5"), six inches (6"), six and five-eights inches (6⅝"), eight and five-eights inches (8⅝"), and ten inches (10"). The water pipe sections and its components as identified above may be made of any material known in the art including, aluminum, polyethylene, PVC, other plastic compositions, galvanized steel, stainless steel, or any combination thereof.

Throughout irrigation system 10, components may be coupled using any coupling method known in the art, including, but not limited to: bolts, screws, rivets, welds, clamps, threaded connections, pins, sleeves, or any other connection method known in the art and any combination thereof.

Further, the water pipe sections include a plurality of sprinklers (not shown) generally extending downward from water conduit 12. Sprinklers disperse water over the crop of the agricultural field and the amount of water dispersed by each sprinkler is generally controlled by control panel 26. There are multiple known sprinkler types, spacing and configurations known in the art. Factors considered in selecting a sprinkler and its type and configuration include, but are not limited to: the crop being grown, what type of applicant (water, fertilizer, herbicide or pesticide), the type of soil, weather, and the growing conditions. Sprinkler can be made from any material known in the art, including, various plastic formulations, aluminum, rubber, and steel. The present disclosure is intended to include all known sprinkler types and configurations, at any spacing known in the art.

The drive unit 16 may support a water conduit 12. FIG. 1 illustrates an embodiment of the drive unit 16 as having a general "V" shape. The drive unit 16 is directly coupled to a water conduit 12. Each drive unit 16 also includes a drive means 18 that propels at least one wheel 20. The drive means 18 is coupled to the at least one wheel 20. The drive means 18 may be coupled to the at least one wheel 10 via a gearbox (not shown).

Drive means 18 is generally an electric motor having a horsepower output ranging from 0.5 to 1.2 hp. The electric motor may be configured to be reversible, thereby having the ability to drive the irrigation system 10 in more than one direction. Embodiments of the present disclosure may include variable speed motors. It is contemplated that other drive motors may be used. Drive means 18 is in electronic communication with control panel 26 wherein control panel 26 controls the speed of drive means 18 through any number of electronic communication and control systems known in the art.

In the embodiment illustrated in FIG. 1, a speed control unit 32 controls the drive means 18B. The speed control unit 32 is coupled or operably connected to the last drive unit 16B and the drive means 18B of the last drive unit 16B. Embodiments of the speed control unit 32 may include, but are not limited to: a percent timer, a variable speed drive, or other speed control drives.

Generally, the machine alignment on the irrigation system 10 is maintained by a mechanical linkage at each drive unit 16 span joint, which operates a micro-switch that starts and stops the drive means 18 on the drive unit 16 to keep in line with the next span. The last drive unit on the irrigation system is designated reference numeral 16B.

As illustrated in FIG. 1, a cantilevered boom 22 extends outwardly from the last drive unit 16B. The cantilevered boom 22 includes an end gun 24 mounted thereon that may be actuated to irrigate areas outside the area covered the water pipe 12 between the center pivot structure 14 and the last drive unit 16B.

The irrigation system 10 further includes a position sensor (40, 41). As illustrated in FIG. 1, the position sensor may comprise an angle sensor 40 coupled to the center pivot structure 14 or a global positioning system (GPS) receiver 41 proximately coupled to the last drive unit 16B. Position sensor (40, 41) is in electronic communication with the control panel 26 and sends a signal to control panel 26 that communicates the position of the irrigation system 10. For example, the angle sensor 40 transmits a signal communicating the rotational position of the water conduit 12 to the control panel 26. In another example, the GPS receiver 41 transmits a signal communicating the GPS coordinates of the last drive unit 16B to the control panel 26.

FIG. 1 illustrates an embodiment where a control panel 26 is mounted to the center pivot structure 14. In a linear move irrigation system 10 (not shown), control panel 26 is generally mounted to a control cart or an end tower. Control panel 26 is generally located on the structural element of irrigation system 10 wherein the water is introduced into irrigation system 10, but any other configuration known in the art is within the scope of the present disclosure. Control panel 26 is coupled to the speed control unit 32 and the position sensor (e.g. angle sensor 40, GPS receiver 41). Control panel 26 generally can monitor many operating conditions as well as control many functions of irrigation system 10. In certain embodiments, control panel 26 may actively monitor irrigation system's 10 function and performance including: the GPS location, whether irrigation system 10 is on or off, voltage, motor speed, actual ground speed, direction, safety, diagnostics, whether the water is on or off, whether the Stop in Slot (SIS) is on or off, water pressure, time, date, field position, end-gun status, and whether the programs are running properly. Control panel 26 also controls irrigation system's 10 functions and settings including: start and stop, turning the water on and off, the water application depth, adjusting the motor speed, direction of travel, turning SIS on and off, controlling the use of the swing arm or end-gun, automatically reversing or stopping irrigation system 10, automatically restarting irrigation system 10, allowing auxiliary control, writing and editing irrigation programs, adjusting the flow rate of an applicant, and controlling sector and sequential programs. Further embodiments of the present disclosure may also include control panel 26 causing the alert of a user if there are any errors in the operation of irrigation system 10, or if any of the functions or conditions the control panel 26 is monitoring have ceased or are outside an acceptable range.

Generally, control panel 26 is housed in a weather-proof box and includes at least an internal memory, a micro-processor, and a user-interface. The user-interface allows a user to input data and/or desired parameters, observe and obtain operating data, and receive output of irrigation system's 10 operational status. Control panel 26 is generally operated using proprietary software and may be connected to a network that allows a user to remotely input operational parameters, remotely view the operational status of irrigation system 10, and receive remote alerts if irrigation system 10 is not operating correctly. Control panel 26 is generally in electronic communication with the various sensors, switches, motors, valves, pumps, and monitors that control the operation of irrigation system 10 and allow control panel 26 to monitor the operating conditions of irrigation system 10. This electronic communication may be achieved through a wired or a wireless connection, or any other electronic communication method known in the art. A person of skill in the art will recognize that many embodiments of control panel 26 are known in the art and all such embodiments of control panel 26 are within the scope of the present disclosure.

Figure 2:
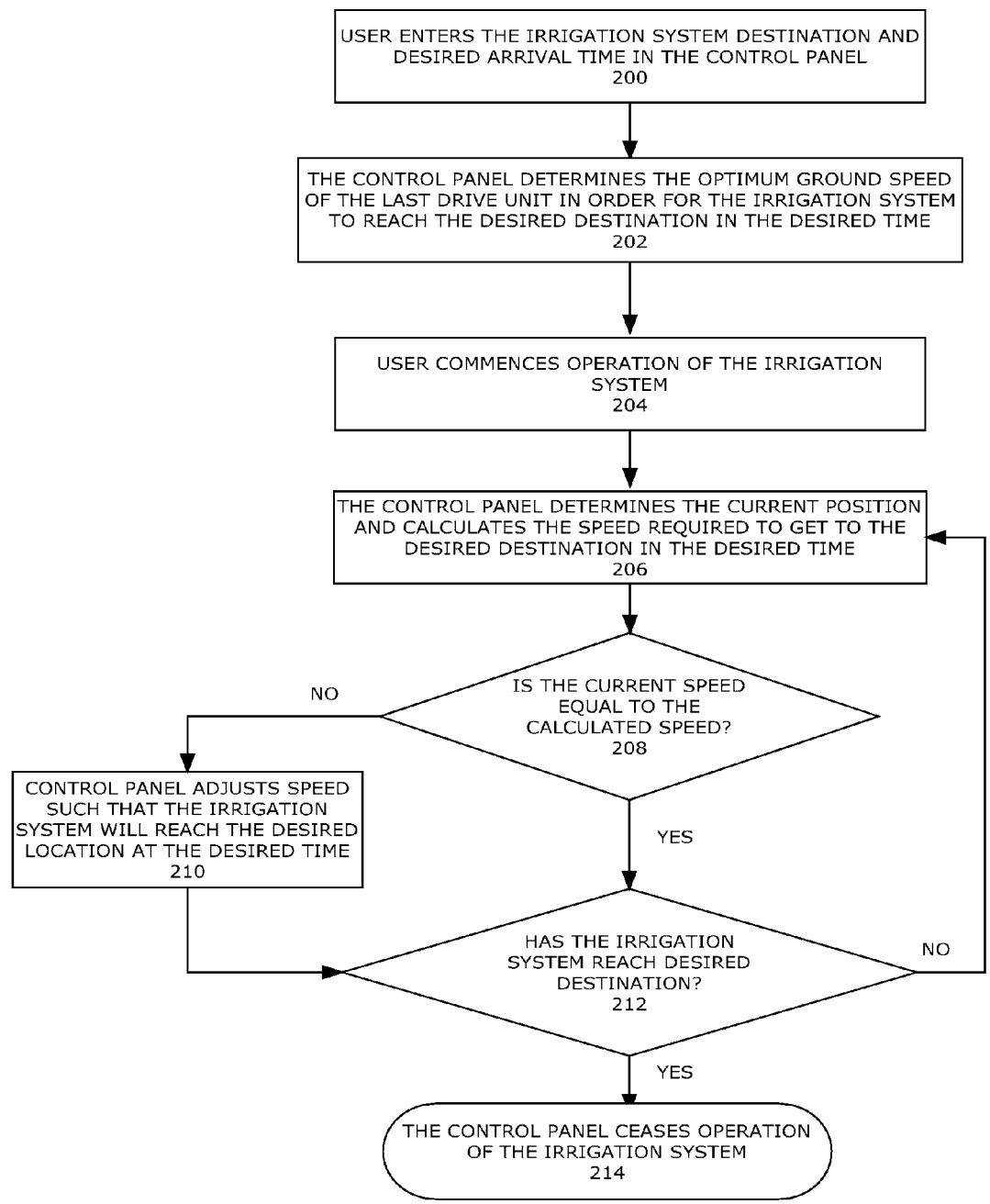
FIG. 2 is a flowchart illustrating the interaction of the elements of an adjustable speed irrigation system in accordance with one embodiment of the present disclosure.

FIG. 2 illustrates a flowchart of a computer operated control system implemented in control panel 26. Aspects of the computer operated control system may be implemented in hardware, firmware, or software. In an implementation, computer operated control system monitors and adjusts the actual ground speed of speed control 32 such that irrigation system 10 arrives at a predetermined user-defined end destination at a predetermined time. FIG. 2 illustrates the interaction of elements of the adjustable speed irrigation system 10 of the present disclosure. A user enters one or more user-defined inputs to control panel 26, but not limited to: a user-defined end destination of irrigation system 10, a user-defined arrival time, or a user-defined application rate of the applicant (block 200).

Based on the user input, control panel 26 predetermines the optimum drive speed of the drive means in order for irrigation system 10 to reach the user-defined end destination at the user-defined time (block 202). The user commences operation of the irrigation system 10 via the control panel 26 (block 204). The control panel 26 is in electronic communication with speed control 32, and the control panel 26 initiates a motor speed of the last drive means 18B via the speed control 32 such that the speed of irrigation system 10 generally corresponds to the predetermined optimum ground speed.

The position sensor (angle sensor 40, GPS receiver 41) transmits a current position of the irrigation system 10 to the control panel 26 at predetermined time intervals (block 206). Control panel 26 determines the distance remaining to reach the user-defined end destination and the time remaining until the user-defined arrival time based on the current position received from the position sensor (block 208). Using the distance remaining and the time remaining, control panel 26 calculates a new optimum ground speed such that irrigation system 10 will reach the user-defined end destination at the user-defined arrival time (block 208). The control panel 26 then determines whether the current speed of the irrigation system 10 is equal to the new optimum ground speed (decision block 210) If the current speed is not equal to the new optimum ground speed ("No" from decision block 210), control panel 26 transmits a signal to the speed control 32 to adjust the current speed of the irrigation system 10 to match the new optimum ground speed such that the difference between the calculated arrival time and the user-defined arrival time is approximately zero. In a further embodiment, the control panel 26 adjusts the flow rate of the applicant to correspond with the new optimum ground speed to maintain the user-defined application rate of the applicant. For example, the new optimum ground speed has increased, which means the flow rate would need to increase in order to maintain the user-defined application rate of the applicant. These steps comprise a process loop of an implementation of the present disclosure that may be repeated at any predetermined time interval.

From the foregoing, it may be seen that the irrigation system 10 of the present disclosure is particularly well suited for the proposed usages thereof. Furthermore, since certain changes may be made in the above disclosure without departing from the scope hereof, it is intended that all matter contained in the above description or shown in the accompanying drawing be interpreted as illustrative and not in a limiting sense. It is also to be understood that the following claims are to cover certain generic and specific features described herein.

We claim:

1. A self-propelled irrigation system comprising:
at least one drive unit;
at least one drive means coupled to said drive unit;
at least one water conduit support by said drive unit;
a speed control unit operably connected to said drive means;
a position sensor operably connected to the self-propelled irrigation system, the position sensor configured to determine a current position of the self-propelled irrigation system and transmit a signal corresponding to said current position; and
a control panel including a memory and a micro-processor, wherein said control panel is in electronic communication with both said position sensor and said speed control and receives a signal from said position sensor, stores said current position in said memory, calculates an optimum ground speed based on said current position in said micro-processor, and adjusts the speed of said drive means via said speed control unit such that said drive unit travels at said optimum ground speed and reaches a user-defined destination in a user-defined time; wherein the speed adjustment of the irrigation system is configured to be performed at predefined intervals; and further wherein said control panel calculates the optimal speed based at least in part on a flow rate of an applicant, further wherein the flow rate of the applicant is determined based at least in part on a pre-determined application depth.

2. The irrigation system of claim 1 wherein said control panel further comprises:
   determines a distance remaining to reach said user-defined end destination based on said current position; and
   determines a time remaining to reach said user-defined arrival time based on said current position.

3. The irrigation system of claim 1 wherein the electronic communication is through the transmission of an electronic signal over a wired or wireless connection.

4. The irrigation system of claim 1 wherein said position sensor comprises an angle sensor.

5. The irrigation system of claim 1 wherein said position sensor comprises a GPS sensor.

* * * * *